United States Patent [19]

Walton et al.

[11] 4,265,672

[45] May 5, 1981

[54] POWDERED TELEPHONE CABLE FILLING COMPOUND

[76] Inventors: Basil V. E. Walton, 54 Melrose Crescent; William E. J. Wannamaker, 121 Avondale Rd., both of Belleville, Ontario, Canada

[21] Appl. No.: 95,515

[22] Filed: Nov. 19, 1979

[30] Foreign Application Priority Data

Nov. 16, 1978 [CA] Canada ............ 316343

[51] Int. Cl.³ ............ C04B 11/24

[52] U.S. Cl. ............ 106/115; 106/193 R; 106/204

[58] Field of Search ............ 106/115, 193 R, 204

[56] References Cited

U.S. PATENT DOCUMENTS

| | | | |
|---|---|---|---|
| 1,585,743 | 5/1926 | Venzie | 106/115 |
| 2,507,508 | 5/1950 | Elliot et al. | 174/114 |
| 2,518,454 | 8/1950 | Elliot | 174/114 |
| 2,537,960 | 1/1951 | Billington et al. | 106/115 |
| 2,831,776 | 4/1958 | Soderberg | 106/115 |
| 3,315,025 | 4/1967 | Tomlinson | 174/107 |
| 3,347,974 | 10/1967 | Arendt et al. | 174/23 |
| 3,569,611 | 3/1971 | Berends | 174/107 |
| 3,655,565 | 4/1972 | McDonald | 252/62.3 |
| 3,681,510 | 8/1972 | Lemieux | 174/23 R |
| 3,682,839 | 8/1972 | Galloway | 252/508 |
| 3,711,621 | 1/1973 | Jachimowicz | 174/23 R |
| 3,903,013 | 9/1975 | Foord et al. | 252/317 |
| 3,996,413 | 12/1976 | Foord et al. | 174/23 C |
| 4,002,819 | 1/1977 | Woytiuk | 174/23 C |
| 4,004,077 | 1/1977 | Woytiuk | 174/23 C |
| 4,045,403 | 8/1977 | Lever et al. | 260/42.42 |

FOREIGN PATENT DOCUMENTS

| | | |
|---|---|---|
| 843012 | 5/1970 | Canada . |
| 906604 | 8/1972 | Canada . |
| 944452 | 3/1974 | Canada . |
| 952991 | 8/1974 | Canada . |
| 972104 | 8/1975 | Canada . |
| 985441 | 3/1976 | Canada . |
| 990372 | 6/1976 | Canada . |
| 993067 | 7/1976 | Canada . |
| 993591 | 7/1976 | Canada . |
| 1026883 | 2/1978 | Canada . |
| 309384 | 4/1929 | United Kingdom . |
| 298085 | 3/1930 | United Kingdom . |
| 316319 | 10/1930 | United Kingdom . |
| 388030 | 2/1933 | United Kingdom . |
| 620230 | 3/1949 | United Kingdom . |
| 757249 | 9/1956 | United Kingdom . |
| 808149 | 1/1959 | United Kingdom . |
| 970037 | 9/1964 | United Kingdom . |
| 1046314 | 10/1966 | United Kingdom . |
| 1081374 | 8/1967 | United Kingdom . |
| 1200395 | 7/1970 | United Kingdom . |
| 1254580 | 11/1971 | United Kingdom . |
| 1296032 | 11/1972 | United Kingdom . |
| 1308779 | 3/1973 | United Kingdom . |
| 1535840 | 12/1978 | United Kingdom . |
| 1538613 | 1/1979 | United Kingdom . |

*Primary Examiner*—James Poer
*Attorney, Agent, or Firm*—Craig & Antonelli

[57] ABSTRACT

The present specification discloses a composition in powdered form, suitable for filling the interstices between the conductors and the outer sheath of telecommunications cables, which comprises (1) from about 80%-99% by weight of a pulverulent material having a high water absorption capacity, and more particularly, between about 30% and about 70% by weight of a finely divided cellulosic material, e.g. wood flour, and from 29% to about 75% by weight of gypsum in powdered form; and (2) from about 1% to about 20% by weight of a water modifying and immobilizing material, preferably a cellulose ether such as hydroxypropyl methylcellulose. Desirably the composition also contains a small amount of a bactericidal and/or fungicidal agent such as zinc oxide. The composition is highly effective in substantially preventing the passage of water along the length of the cable in the event of a break in the sheath permitting water to enter; it does not require the use of grease-like materials, and is made up of inexpensive, readily available materials.

17 Claims, No Drawings

POWDERED TELEPHONE CABLE FILLING COMPOUND

This invention relates generally to cable filling compositions, and more particularly to improvements in compositions for filling the voids or interstices in multi-strand telecommunications cables.

Since the year 1965, attempts of one kind or another have been used to eliminate or prevent the movement of water into buried telephone cables and, to a lesser extent, into aerial telephone cables, the approaches taken ranging from the placement of mastic type blocking compounds at fixed intervals along the cable length to the "fully filling" of cables with a wide variety of materials, usually, but not always, of a grease-like nature.

A telecommunications cable consists of a central core of coated copper of aluminium wires arranged in "pairs", which pairs are in turn arranged in groups, usually multiples of 25 or 100, the larger the pair count the larger the diameter of the core; plus a plastic core wrap, in turn surrounded by a metal shield bonded to a plastic outer jacket. There may also be a metal tape wrapped around the core to provide a heat barrier for the core.

In earlier times, the materials used to cover the copper wire, which wire may range from a very fine filament to a wire of rather significant diameter, was cellulosic in nature, e.g. specially treated paper; however, with the advent of new and low cost plastic materials, paper covered wires became uneconomical to produce in relation to plastic coated wires.

While plastic coated wires offer technical and economic advantages over paper coated wires in a telecommunications cable system, they suffer one significant drawback, the drawback being that associated with the permeability of the plastics insulation to moisture. This in turn led to the concept of "fully filling" the interstitial spaces between the conductor pairs in the core with a suitable water repellant compound, i.e. petrolatum or modified petrolatum.

Over the years the specified and non-specified demands for buried telephone cables have become such that significant modifications to the original filling compounds have become necessary, including the ability of the compound to withstand movement at elevated temperatures, to exhibit no fissuring upon cooling to significantly below ambient temperatures, to have minimal or no effect on the plastics insulation present within the cable, to impede the flow of water within a cable under specified test conditions, to be easily handled by those personnel responsible for the splicing of telephone cables, to name but a few. While it is possible to meet the foregoing requirements through the careful selection and blending of appropriate ingredients it remains a fact that, by its very nature, a grease-type filling compound will present certain difficulties in the field as splicing is carried out, it will also, despite very significant improvements in formulation, result in some attack on the plastics insulations used in the manufacture of cable.

In order to overcome the foregoing difficulties or defects, a number of attempts have been made to substitute powders or water absorbing materials for the grease-like compounds presently used for the "fully filling" of telecommunications cables, such powders having varying degrees of effectiveness and general practicability and the following patents are cited by way of example:

(a) U.K. Pat. No. 1,046,314 of Siemens G. Halske, AG refers to the use of materials which swell in the presence of water, which swelling characteristics is also a feature of other, later patented materials. U.K. Pat. No. 1,200,395 of Siemens AG makes reference to water swellable materials in the presence of petroleum jellies and/or silicone oils/greases, while U.K. Pat. No. 1,200,434 makes reference to the water absorptive capability of paper to limit the longitudinal ingress of moisture.

(b) A number of U.S. patents exist (see for instance, U.S. Pat. No. 2,507,508 of Elliott et al) which have reference to water modifiers, i.e. products which on contact with water will result in a change in the viscosity of water with or without the presence of modifying fillers. Some of these fillers are of a reactive nature, being reactive to produce gaseous material which in turn creates pressure within the cable, thus moving the viscosity modified water in such a fashion as to create a block preventing the further movement of moisture along the cable; while yet other patents (as for instance, U.S. Pat. Nos. 4,002,819 and 4,004,077 of Woytiuk) have to do with the presence of hydrophilic powder(s) which are capable, in the presence of water, of reacting to increase the viscosity of the water, which modified water is then repelled by a hydrophobic powder thus limiting the area wetted. Any additional pressure exerted on the gel serves to compact the viscosity modified water, further limiting the resistance to water flow in the cable.

(c) Yet other known patents have to do with the limiting of water within a ruptured cable by placing along the length of the plastics insulation itself, small fibres of cellulosic material which in the presence of water will swell, thus impeding the progress of water along the cable.

While each of the foregoing patents has, in its time, offered something to the capability of cable manufacturers to produce telecommunications cables which will limit the ingress of moisture in a ruptured or permeable cable, in one sense or another they fall short of the ideal filling compound for any one or more of the following reasons:

1. The U.K. patents referred to utilized grease-like substances as a base for the water swellable material, which does not improve the handling characteristics of the filling compound or its general effect upon the plastics insulation.

2. While absorbent materials are effective, their ability to absorb moisture is limited and once the limit of that ability is reached, water may progress along the cable unhindered.

3. The use of powders between the core and the outer sheath, which swell when wetted, are of extremely doubtful value and of virtually no value in the event of massive cable rupture.

4. The use of water swellable powders, whether they be fast acting or slow acting, can create significant internal pressure within the cable unless extreme care is taken to control the amount of filling powder used.

5. The release of gaseous materials due to the interaction of water on the powder components, whether or not a water swellable material is present within the powder system is both dangerous and technically undesirable in that (a) internal gas pressure is built up within the cable and (b) electrolytic ions are generated which affect the Specific Inductive Capacity of the filling system, a decidedly undesirable effect.

6. The use of powders comprised of a treated powder so as to make it hydrophobic and a water reacting, hydrophilic powder, while they have overcome many of the earlier problems associated with powder filling compounds, have as limiting factors (a) an inherently high Specific Inductive Capacity, (b) the fact that the individual cable pairs need to be coated with a low viscosity mineral oil so as to ensure that at least some quantity of the filling compound adheres to the plastics insulation, which low viscosity mineral oil contributes in some measure to the eventual physical degradation of the plastics insulation itself, (c) high cost and (d) the difficulty of actual cable manufacture which requires that the cable be partly filled only.

It is an objective of the present invention to provide a powdered telephone cable filling composition which substantially avoids the previously mentioned drawbacks of the previously known filling compositions.

The filling material of the present invention, a powder, is comprised of materials having both specific and beneficial effects on the powder as a whole, which effects fall into the categories of:

(a) High water absorption (b) Water immobilization

As noted, the effectiveness of cellulose in the form of cable paper and paper fibres has long been known. Cellulose is also known to possess acceptable electrical properties, an extremely important characteristic of any would-be telephone cable filling compound.

The present invention, in one broad aspect, resides in a composition in powder form, adapted for use in filling telecommunications cables, said composition comprising (A) from about 80% to about 99% by weight of a pulverulent material having a high water absorption capacity, comprising (i) a finely divided cellulosic material, and (ii) at least one of the following: (a) gypsum; (b) a hydrous aluminum silicate; (c) a sodium aluminosilicate; (d) magnesium oxide; (e) magnesium carbonate; (f) mica powder; (g) talc; (h) a diatomaceous clay; (i) anhydrous aluminum silicate; and (j) finely divided silica; and (B) from about 1% to about 20% by weight of a water-modifying and immobilizing material.

More particularly, the present invention resides in a composition, in powder form, adapted for use in filling telecommunications cables, said composition comprising: (1) between about 30% and about 70% by weight of a finely divided cellulosic material; (2) from 29% to about 75% by weight of gypsum, in powdered form; and (3) from 1% to about 20% by weight of a water modifying and immobilizing material.

This invention in a further aspect, resides in an improvement in a telecommunications cable having a plurality of conductors and an outer sheath, which improvement comprises having the interstices between the conductors and the outer sheath filled with a composition in powder form comprising: (A) from about 80% to about 99% by weight of a pulverulent material having a high water absorption capacity, comprising (i) a finely divided cellulosic material, and (ii) at least one of the following: (a) gypsum; (b) a hydrous aluminum silicate; (c) a sodium aluminosilicate; (d) magnesium oxide; (e) magnesium carbonate; (f) mica powder; (g) talc; (h) a diatomaceous clay; (i) anhydrous aluminum silicate; and (j) finely divided silica; and (B) from about 1% to about 20% by weight of a water-modifying and immobilizing material.

One readily available, inexpensive source of acceptable cellulosic material, suitable as an ingredient in the powdered filling compound of the present invention, is a product known generally as "Wood Flour", which is available in many forms from many sources and is of varying moisture content, particle size, etc. Wood flour is a non-toxic material and may be handled without fear of adverse physical effects in all normal circumstances. Wood flour (or equivalent cellulosic material) which has been found to be satisfactory for use in the cable filling compositions of this invention, has the following physical characteristics and/or meets the following specification:

| CHARACTERISTIC | REQUIREMENT | METHOD |
|---|---|---|
| A. Contamination | Material to be free of particles of ground bark or knots, splinters, burned or charred material, twine, straw, oil, dirt, coarse grit, or other obviously foreign material. | Visual |
| B. Apparent density grams/cc | Minimum - 0.125<br>Maximum - 0.160 | WC-2E/1 |
| C. Sieve Analysis | | WC-7-B-½ |
| % on U.S. 80 | None | |
| % on U.S. 100 | Maximum - 0.5 | |
| % on U.S. 140 | Maximum - 4.0 | |
| % thru U.S. 140 | Minimum - 95.5–105 | Microns |
| D. Moisture content | | WC-6-B-1/1 |
| % by wt. (Loss | Minimum - 4.0 | |
| in wt. by drying at 105° C.) | 1 Hr. | Maximum - 7.0 |
| E. Extractables by di-ethyl ether, % by wt. | Maximum - 2.0 | WC-21-G-3/1 |

Another extremely effective material for the absorption of water, is the product known as "Plaster of Paris" or "Gypsum", being chemically $CaSO_4.\frac{1}{2}H_2O$. This product, in powdered form, is capable of absorbing more than its own weight of water without releasing this water. Plaster of Paris is a widely used material and is universally known and used as a means of preparing plaster casts.

Gypsum is a preferred material to use in conjunction with the cellulosic material because (a) it has an extremely high water absorptive capability and (b) produces within the final compound, when wet, a mastic-like consistency which is highly desirable in the wetted filling compound. Other pulverulent materials may, however, if desired, be substituted for part or all of the gypsum in the formulation. Such other materials which may be used to replace part or all of the gypsum include:

(1) synthetic or natural hydrous aluminum silicates;

(2) sodium aluminosilicates;

(3) silica gels;

(4) magnesium oxide, natural or synthetic;

(5) calcined or uncalcined magnesium carbonate;

(6) mica powder;

(7) talc;

(8) diatomaceous clays;

(9) anhydrous aluminum silicates;

(10) amorphous silica; and

(11) silica flours, such as those known under the trademark CAB-O-SIL, or those known under the trademark SYLOID:

plus any other mineral type filler having the required degree of fineness and electrical properties. Powders having a water absorbing capacity are preferred to those with no such capacity.

A suitable grade of gypsum to use in the present invention is that supplied by Domtar Ltd., and meeting the following specifications:

| | | | |
|---|---|---|---|
| 1. | Use | 64 | Assuming P.C. |
| | Consistency Pouring | 58 cc/100g | + 10% |
| 2. | Vicat | 31 mins. | |
| | Setting Time Gilmore | 27/40 | |
| 3. | Setting Expansion, In./In. | 0.0023" | |
| 4. | Compressive Strength, Dry at pouring consistency | 3,000 psi | |
| 5. | Shelf Life, (approx.) | 9 mos. | P.E. lined bags |
| 6. | Brightness, % $MgCO_3$ | 87% | White |
| 7. | % by wt. - 48 mesh Tyler | 99.9% | |
| | -100 mesh Tyler | 98% | |
| | -200 mesh Tyler | 92% | |
| | -325 mesh Tyler | 83% | |

In that bacteria and fungi are universal in their occurrence and in that in order for them to multiply an aqueous environment is necessary; and further in that, in the ultimate situation, water in sufficient quantities could be present in a communications cable, it is considered necessary to guard against the possible bacterial/fungicidal degradation of the filling compound after its contact with water and for this purpose zinc oxide has been used in the formulation although any one of a number of other effective bactericides/fungicides would perform equally as well. zinc oxide is a universally known and employed ingredient of many medicinal preparations and for these purposes has received F.D.A. approval.

Water-modifying and immobilizing agents which have been found to be effective for use in the telephone cable filling composition of the present invention are methyl cellulose either products, such as those known and used and sold commercially under the trademark METHOCEL. These products are derived from and have the polymeric backbone of cellulose. Cellulose ether products which are suitable are the following:

(1) Methylcellulose, which is a fine grayish-white fibrous powder, and is derived from cellulose fibers by conversion to alkali cellulose and then treatment with a methylating agent such as methyl chloride. It has the following chamical structure:

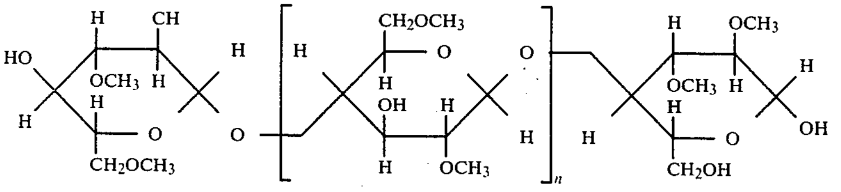

Its molecular weight may vary from 40,000 to 180,000, and its methoxy group content is in the range from 25% to 33% (27.5%-31.5% for METHOCEL A).

(2) Hydroxypropyl methyl cellulose, which is a well known and effective water modifying agent, widely used in food applications. Typical hydroxypropyl methyl cellulose products are those sold under the trademarks METHOCEL E, METHOCEL F, METHOCEL J AND METHOCEL K. Hydroxypropyl methylcellulose is a white powder and has the following chemical structure:

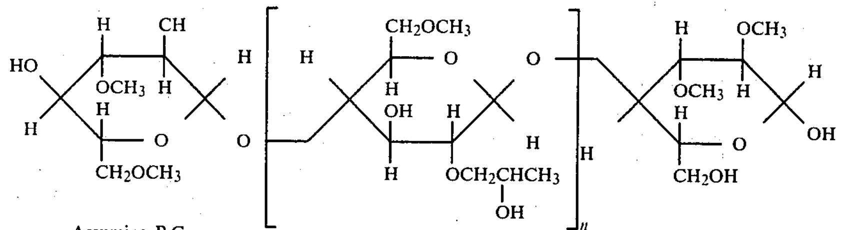

(3) Hydroxybutyl methylcellulose, such as the products sold under the trademark METHOCEL HB. Hydroxybutyl methylcellulose has a chemical structure generally similar to hydroxypropyl methylcellulose, but differs from the latter compound in that it contains hydroxybutoxy substituents on the anhydroglucose units instead of ($-OCH_2CH(OH)CH_3$) groups, the hydroxybutoxy groups comprising 2-5% by weight of the cellulose derivative.

While it has been found that hydroxypropyl methylcellulose or hydroxybutyl methylcellulose perform in an acceptable manner in combination with the above noted ingredients, other substituted cellulose and noncellulose water modifying compounds may also be adequately used in the present invention, their use within the invention being to immobilize the water entrapped by the highly absorbent wood flour/gypsum powder base.

Examples of other water modifying and immobilizing agents which may be used in the compositions of the present invention if desired, in place of part or even all of the above-mentioned cellulose ethers are polysaccharides such as agar, carrageenin, alginic acid and salts thereof, and those obtained by the action of bacteria of the genus Xanthomonas on glucose, such as for instance, that sold under the trademark "Kelzan" (Kelco Chemical Company) (produced by the fermentation of glucose with the bacterium *Xanthomonas campestris* NRRL B-1459, U.S. Department of Agriculture);

water soluble gums such as gum tragacanth, acacia gum, guar gum, locust bean gum, okra gum and karaya gum; bentonite and kaolinite clays; and polyacrylamide.

It has been found that certain variations in the percentages of wood flour and gypsum are possible in conjunction with a particular water immobilization agent so as to produce (a) rapid entrapment and immobilization of water and (b) a desirable consistency in the water modified filling powder, which consistency ideally is that of a soft mastic material which in turn forms a barrier to the further movement of water in the cable.

Due to its inherently low Specific Inductive Capacity (S.I.C wood flour, in addition to its water absorptive properties, contributes beneficially to the S.I.C. of the filling powder, as does also the cellulose derivative used in the formulation to immobilize the water. The properties of water absorption plus low Specific Inductive Capacity plus low unit cost make wood flour a highly functional and highly desirable component of the formulation.

Due to the virtually non-swelling nature of the filling powder of this invention, a telecommunications cable may be substantially filled with the powder filling medium which eliminates the need for coating the individual conductor pairs with any kind of oil/grease, similarly, due to the virtually fully filled nature of the cable, employing a powder of this invention, little or no movement of the filling medium is possible in transit and/or installation.

The following specific formula was found to entrap and immobilize water applied in the form of a 3' head to a cable model into which several water ingress points had been made:

45% Wood Flour by weight
50% Gypsum by weight
2.5% Zinc Oxide by weight
2.5% Hydroxypropyl Methylcellulose by weight Experimentation has shown that the wood flour content of the powder composition may be varied from about 30% to about 70% by weight of the composition. At lower percentage levels the powder has a higher overall Specific Inductive Capacity which is undesirable, while at higher percentage levels of wood flour content, the physical nature of the powder after wetting is not considered satisfactory in that it is no longer a mastic type material.

The gypsum content may be varied from about 29% to about 75%, by weight of the composition. At lower percentage levels the powder, after wetting with water, does not have the desired mastic consistency while at higher percentage levels the powder, after wetting, is a brittle solid which is unacceptable in a telecommunications cable application.

The percentage of water modifying and immobilizing material, which in this specific instance is hydroxypropyl methyl-cellulose, can vary from 1% by weight of the final formulation, to about 20%, depending upon the precise chemical nature of the water modifying compound chosen, the Specific Inductive Capacity desired in the final product, and cost considerations.

The zinc oxide utilized in the formulation may vary from about 0.10% to about 5.0% by weight of the final formulation, which percentage will be determined in some degree by the quantity of wood flour used in the final formulation.

Not included in the above specific formulation but also of benefit in the composition of this invention, are such products as (a) bran flour and (b) non-ionic surfactants. The former, if included in the formulation, will produce a significant water swelling capability to the compound while the latter will reduce the percentage of water modifying and immobilizing agent required.

No specific equipment is necessary for the manufacture of the compositions of this invention. The filling compound can be produced using any suitable type mixer employed in mixing and/or blending of pastes and viscous materials, for example, a gate type mixer, a Sigma blade mixer, a putty mixer, etc. The selection of the appropriate equipment to use for this purpose can be readily made by any person skilled in the art. It is however, vitally important that all components be maintained in the driest possible state during manufacture of the composition, and during subsequent packaging of the product, so as not to lower the effectiveness of the powder cable filling composition as a water absorbing-/entrapping agent.

The following are examples of compositions according to this invention which performed satisfactorily on testing:

EXAMPLE 1

65% by weight Gypsum
30% by weight Wood Flour
2.5% by weight Zinc Oxide
2.5% by weight Hydroxypropyl Methylcellulose

EXAMPLE 2

30% by weight Gypsum
65% by weight Wood Flour
2.5% by weight Zinc Oxide
2.5% by weight Hydroxypropyl Methylcellulose These formulations are to be contrasted with the following two comparative examples, which illustrate cable filling compositions which did not perform satisfactorily on testing:

Comparative Example A

80% by weight Gypsum
15% by weight Wood Flour
2.5% by weight Zinc Oxide
2.5% by weight Hydroxypropyl Methylcellulose

Comparative Example B

80% by weight Wood Flour
15% by weight Gypsum
2.5% by weight Zinc Oxide
2.5% by weight Hydroxypropyl Methylcellulose The tests to which the filling compositions of the invention were subjected included the following:

Apparent Density/20° C.
Specific Gravity/20° C.
Specific Inductive Capacitance/20° C.
Dissipation Factor/20° C./60 Hz
Water Permeation Coefficient/20° C.
Flowability/20° C.

The following are typical test data obtained for powdered telephone cable filling compositions in accordance with the present invention:

| Sample A | |
|---|---|
| Apparent Density/20° C. | 0.42 gm/ml |
| Specific Gravity/20° C. | 0.64 |
| Specific Inductive Capacity/20° C. | 2.33 |
| Dissipation Factor/60 Hz/20° C. | 2.7% |
| Water Permeation Coefficient/20° C. | 0.25 |
| Flowability/20° C. | Nil |

| Sample B | |
|---|---|
| Apparent Density/20° C. | 0.45 gm/ml |
| Specific Gravity/20° C. | 0.65 |
| Specific Inductive Capacity/20° C. | 2.36 |
| Dissipation Factor/60 Hz/20° C. | 3.2% |
| Water Permeation Coefficient/20° C. | 0.20 |
| Flowability/20° C. | Nil |

It is vital that the filling composition, in situ, not only absorb water but that it also immobilize the water it has absorbed. Ideally this should take place as rapidly as possible in order to limit the passage of water through a cable. The following is considered probably the single most critical test to which a powdered filling material, suitable for use in a telecommunications cable, may be subjected and represents a test designed to demonstrate the water absorbing/immobilizing properties of a cable filling composition:

Approximately 10 gm of the filling composition is packed into a steel tube 24" long and ¼" I.D., which is drilled with 1/16" diameter holes at 1½" intervals commencing 1½ in from each end, there being 14 openings in the total length of the tube. The ends of the tube are sealed with a ½" plug of glass wool.

The test piece with the 1/16" diameter holes facing vertically is placed horizontally in a tank, 3' below the surface of the water present in the tank and is maintained in this position for 24 hours, at room temperature and atmospheric pressure, after which time the test piece is removed and examined to determine to what extent water has entered through the 1/16' diameter holes and to what extent it has migrated beyond the point of entry.

A filling composition which allows water to travel the full distance between one test hole and the next test hole, i.e. a distance of 1½", is considered to have failed the test.

Up to 50% by weight of the wood flour present in the composition could be replaced by bran flour if desired. However, if bran flour is included, less than a fully filled cable would be necessary as there is a significant swelling factor involved when bran flour becomes wetted. A maximum of 5% by weight of the total composition of a non-ionic surfactant would be sufficient to improve the effectiveness of the water modifying/immobilizing agents within the composition. Depending upon the exact nature of the surfactant, as little as 0.5% by weight thereof, based on the final formulation, could also function satisfactorily in this context.

While none of the materials utilized in the composition of this invention are new or, in any sense, unknown, we believe that the particular combination of ingredients, chosen for their specific contribution to the end product, is unique in terms of its novelty and effectiveness and for the reasons described herein, will substantially eliminate the deficiencies of the presently available cable filling compounds and method of applying these compounds, to the betterment of the telecommunications cables incorporating such compounds.

While the present invention has been described in detail herein with reference to specific embodiments, it will be appreciated by persons skilled in the art that variations can be made in either or both of the main ingredients, viz. the pulverulent material having a high water-absorption capacity, and the water modifying and immobilizing material, and/or in the proportions of the various ingredients, without departing from the inventive concept. It is intended, then, that the invention be limited only by the claims which follow.

We claim:

1. A composition in powder form, adapted for use in filling telecommunications cables, said composition comprising: (A) from about 80% to about 99% by weight of a pulverulent material having a high water absorption capacity, comprising: (i) a finely divided cellulosic material, and (ii) at least one of the following: (a) gypsum; (b) a hydrous aluminum silicate; (c) a sodium aluminosilicate; (d) magnesium oxide; (e) magnesium carbonate; (f) mica powder; (g) talc; (h) a diatomaceous clay; (i) anhydrous aluminum silicate; and (j) finely divided silica; and (B) from about 1% to about 20% by weight of a water-modifying and immobilizing material.

2. A composition, in powder form, adapted for use in filling telecommunications cables, said composition comprising (1) between about 30% to about 70% by weight of a finely divided cellulosic material; (2) from 29% to about 75% by weight of gypsum, in powdered form; and (3) from about 1% to about 20% by weight of a water modifying and immobilizing material.

3. A cable filling composition according to claim 2, in which the finely divided cellulosic material is wood flour.

4. A cable filling composition according to claim 2, wherein there is also included a bactericidal and/or fungicidal agent.

5. A cable filling composition according to claim 2, 3 or 4, wherein the water modifying and immobilizing material is a cellulose ether, either in modified or unmodified form.

6. A cable filling composition according to claim 2, 3 or 4, wherein the water modifying and immobilizing material is hydroxypropyl methylcellulose.

7. A cable filling composition according to claim 4, wherein the bactericidal and/or fungicidal agent is zinc oxide.

8. A composition according to claim 7, wherein the zinc oxide is present in an amount of from about 0.10% to about 5.0% by weight of the total composition.

9. A composition according to claim 2 or claim 4 which includes also a non-ionic surfactant.

10. A composition according to claim 2 or claim 4, wherein bran flour is also incorporated in the composition.

11. A composition according to claim 2 or claim 4 wherein the composition incorporates also both bran flour and a non-ionic surfactant.

12. A cable filling composition according to claim 2, and having the following specific formulation:

45% wood flour
50% gypsum
2.5% zinc oxide
2.5% hydroxypropyl methylcellulose, said percentages being by weight, based on the total composition.

13. A cable filling composition according to claim 2, and having the following specific formulation:

65% gypsum
30% wood flour
2.5% zinc oxide
2.5% hydroxypropyl methylcellulose, said percentages being by weight, based on the total composition.

14. A cable filling composition according to claim 2, and having the following specific formulation:

30% gypsum
65% wood flour
2.5% zinc oxide
2.5% hydroxypropyl methylcellulose, said percentages being by weight, based on the total composition.

15. A cable filling composition according to claim 2, 3 or 4, wherein the water modifying and immobilizing material is methyl cellulose.

16. A cable filling composition according to claim 2, 3 or 4, wherein the water modifying and immobilizing material is hydroxybutyl methylcellulose.

17. A cable filling composition according to claim 2 or claim 4, wherein a non-ionic surfactant is present in the composition in an amount ranging from about 0.5% to about 5.0% by weight, based on the total composition.

* * * * *